US006262386B1

(12) United States Patent
Förnsel

(10) Patent No.: US 6,262,386 B1
(45) Date of Patent: Jul. 17, 2001

(54) PLASMA NOZZLE WITH ANGLED MOUTH AND INTERNAL SWIRL SYSTEM

(75) Inventor: Peter Förnsel, Spenge (DE)

(73) Assignee: Agrodyn Hochspannungstechnik GmbH, Steinhagen (DE)

( * ) Notice: Subject to any disclaimer, the term of this patent is extended or adjusted under 35 U.S.C. 154(b) by 0 days.

(21) Appl. No.: 09/612,123

(22) Filed: Jul. 7, 2000

(30) Foreign Application Priority Data

Jul. 9, 1999 (DE) .......................................... 299 11 974 U

(51) Int. Cl.[7] ...................................................... B23K 10/00

(52) U.S. Cl. ................................ 219/121.52; 219/121.39; 219/121.44; 219/121.51; 219/121.5

(58) Field of Search ............................ 219/121.52, 121.5, 219/121.48, 121.39, 121.44, 121.45, 121.51, 74, 75; 313/231.31, 231.41

(56) References Cited

U.S. PATENT DOCUMENTS

| | | | | |
|---|---|---|---|---|
| 3,707,615 | * | 12/1972 | Rotolico | 219/121.52 |
| 4,877,937 | * | 10/1989 | Muller | 219/121.59 |
| 5,278,387 | * | 1/1994 | Borne | 219/121.39 |
| 5,837,958 | | 11/1998 | Förnsel . | |

FOREIGN PATENT DOCUMENTS 298 05 999 U 6/1998 (DE) .

* cited by examiner

*Primary Examiner*—Mark Paschall
(74) *Attorney, Agent, or Firm*—Richard M. Goldberg

(57) ABSTRACT

Plasma nozzle, in particular for pretreating surface, including a casing defining a nozzle channel which has an axis and a mouth and through which a working gas is passed, an electrode disposed coaxially in the nozzle channel, and a counter electrode surrounding the nozzle channel, wherein the mouth of the nozzle channel is angled relative to the axis thereof.

17 Claims, 2 Drawing Sheets

PLASMA NOZZLE WITH ANGLED MOUTH AND INTERNAL SWIRL SYSTEM

BACKGROUND OF THE INVENTION

The invention relates to a plasma nozzle, in particular for pretreating surfaces, the nozzle comprising a tubular casing forming a nozzle channel through which a working gas is passed, an electrode disposed coaxially in the nozzle channel, and a counter electrode surrounding the nozzle channel.

A plasma nozzle of this type is disclosed in DE 195 32 412 A corresponding to U.S. Pat. No. 5,837,958 and serves, for example, for pretreating the surfaces of plastic (synthetic resin) materials such that coating of the surface with adhesive, printing inks and the like is made possible or facilitated. Such a pretreatment is necessary because plastic surfaces can normally not be wetted with liquids and do therefore not accept the printing ink or the adhesive. The pretreatment modifies the surface structure of the plastic material in such a manner that the surface can be wetted with liquids having a relatively large surface tension. The surface tension of the liquids with which surface can just be wetted is an indicator for the quality of the pretreatment.

The known plasma nozzle provides a relatively cool but nevertheless highly reactive plasma jet which has approximately the shape and dimensions of a candle flame and therefore permits also the pretreatment of profiled workpieces having a relatively deep relief. Thanks to the high reactivity of the plasma jet, a very short pretreatment time is sufficient, so that the workpiece can be moved past the plasma jet with a relatively high velocity. The relatively low temperature of the plasma jet therefore permits also the pretreatment of heat sensitive plastic materials. Since no counter electrode on the rear side of the workpiece is necessary, the surfaces of arbitrarily thick block-like workpieces, hollow bodies and the like can be pretreated without difficulties. For an even treatment of larger surface areas, the cited publication purposes an array of a plurality of staggered plasma nozzles. This, however, requires complex installations.

For pretreatment of larger surface areas, DE 298 05 999 U discloses an apparatus in which two plasma nozzles are mounted eccentrically and with parallel axes on a common rotating head, so that, when the surface is scanned with the rotary head, pretreatment is achieved in a stripe which has a width corresponding to the diameter of the rotating head. This apparatus is however not suitable for treating bulged surfaces the radius of curvature of which is in the order of the diameter of the rotating head. Moreover, the eccentric arrangement of at least two nozzles and the relatively high rotary speed lead to the occurrence of forces of inertia and gyroscopic forces when the rotating head is moved along more than one axis, for example with the aid of a robot arm.

In general, the known plasma the nozzles eject the plasma in axial direction of the nozzle channel. In case of workpieces having a complicated shape, this has the drawback that the locations to be treated are sometimes difficult to reach, in particular, when the nozzle is moved along the workpiece by means of a robot.

SUMMARY OF THE INVENTION

It is therefore an object of the invention to provide a plasma nozzle with which the surface portions to be pretreated can be reached more easily.

This object is achieved by a plasma nozzle of the type indicated above, in which the mouth of the nozzle channel is angled relative to the axis of the nozzle channel.

Thus, this nozzle generates a plasma jet which is inclined relative to the axis of the nozzle channel, so that, for example, undercut parts of a workpiece can be reached more easily.

Although the plasma jet is deflected from the original axial direction at the mouth of the nozzle, experiments have shown that this does not impair the stability of the plasma jet and its efficiency in the pretreatment of surfaces.

In one preferred embodiment the casing or at least the part of the casing forming the nozzle channel is rotatable about is longitudinal axis. When the casing is caused to rotate rapidly, and the plasma nozzle is moved past a workpiece, it is therefore possible to treat, within a single pass, a surface stripe the width of which is significantly larger than the diameter of the plasma jet. Since only a single nozzle is used, the complexity of the installation is significantly smaller than in case of the previously described rotating head. In addition, the forces of inertia are greatly reduced because the casing rotates around its longitudinal axis. Thus, a plasma nozzle is provided which has a compact construction and nevertheless permits and efficient plasma treatment of large surface areas.

The angle of deflection of the plasma jet relative to the rotary axis can be selected in accordance with the demand and may for example amount to 90° or more. In this embodiment, the plasma nozzle is particularly suited for pretreatment of the internal surfaces of pipes or tubes. It is possible for example to mount the plasma nozzle inside of the annular gap of an extrusion die, so that an extruded tube may be pretreated right after it has exited from the extruder.

Preferably, the casing is rotatable relative to the electrode and the supply system for the working gas which are mounted inside of the nozzle channel, so that the electrode and the gas supply system can be held non-rotatably and only the surrounding casing is rotated. As a result, no sliding contacts, rotary joints or the like are needed for the supply of the working gas and for the power supply to the electrode. The counter electrode may be formed directly by the rotating casing and is preferably grounded, so that it is not necessary to protect the casing and the associated rotary drive system against contact or touch.

A drive disk or an toothed gear for rotatingly driving the casing may be provided on the outer periphery of the casing.

Like in the plasma nozzle of the type indicated in the preamble, the working gas is preferably swirled, so that it flows through the nozzle channel in vortex fashion, and the electric are formed between the electrode and the counter electrode is channeled in the vortex core until it reaches the region of the mouth of the nozzle channel. Thus, the plasma jet is stabilized, and, inside of the vortex core, the working gas is brought into intimate contact with the electric arc, so that the reactivity of the plasma is enhanced.

In another preferred embodiment the mouth of the nozzle channel is formed in a mouth piece which is inserted in the casing and in which a passage is defined which is inclined relative to the axis of the casing. The passage of the mouth piece may be tapered towards its downstream end.

Preferably, the mouth piece is rotatably supported in the casing by means of a contactless bearing such as a magnet bearing or an aerodynamic bearing.

The counter electrode is preferably formed by the mouth piece, and the contactless bearing defines a gap between the casing and the mouth piece which is so dimensioned that an arc discharge occurs across this gap, thereby to ground the mouth piece.

The contactless bearing may be an axial/radial bearing and the mouth piece may be dynamically biased against this bearing by the working gas flowing through the mouth piece.

Further, the mouth piece may be aerodynamically driven for rotation.

BRIEF DESCRIPTION OF THE DRAWINGS

Preferred embodiments will now be disclosed in conjunction with the drawings in which.

DETAILED DESCRIPTION

Figure 1:
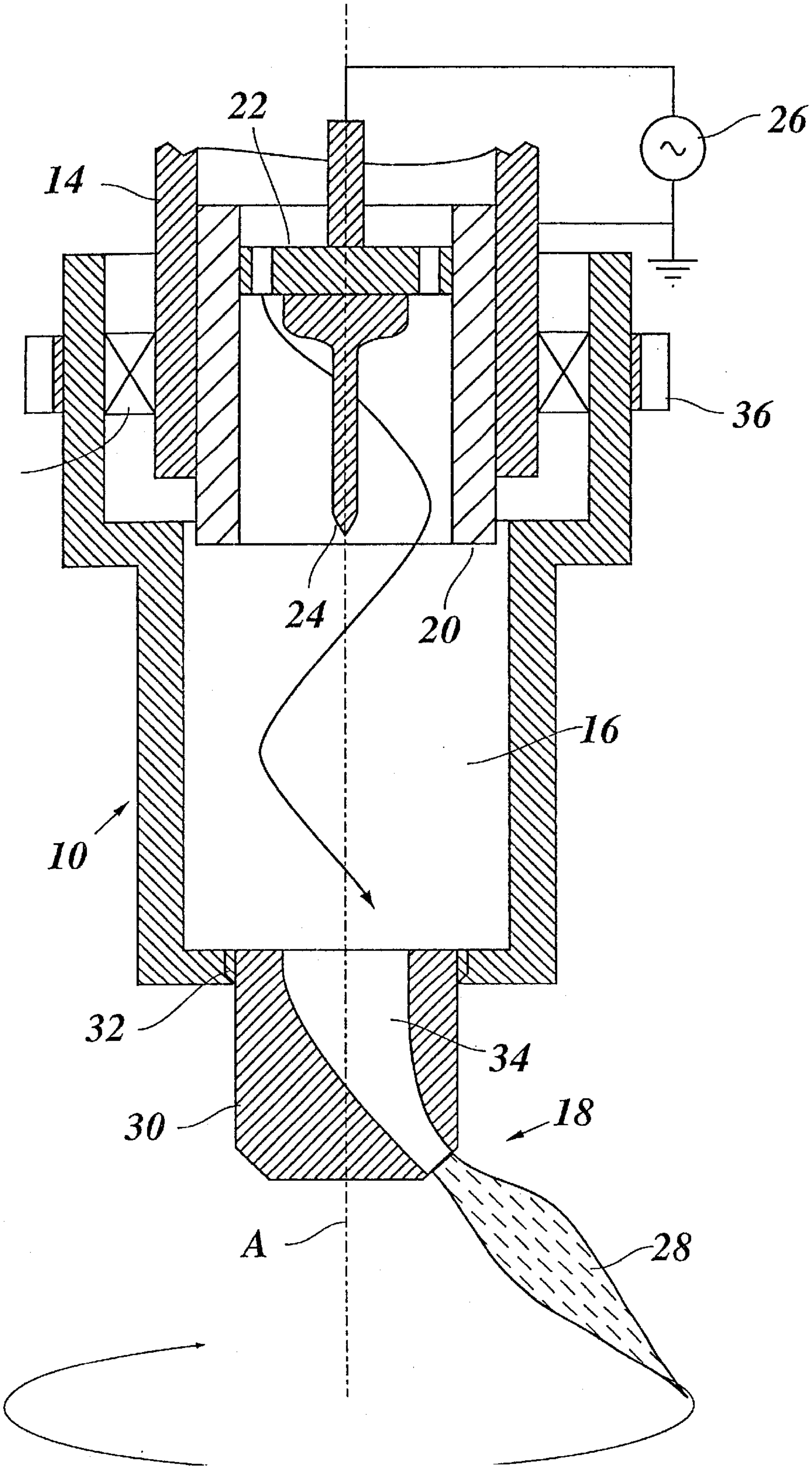
FIG. 1 is an axial section of the plasma nozzle.

The plasma nozzle shown in FIG. 1 has a tubular casing 10 which has an increased diameter in the upper part, as seen in the drawing, and this upper part is rotatably supported on a stationary supporting tube 14 by means of a bearing 12. The interior of the casing 10 forms a nozzle channel 16 which leads from the open end of the supporting tube 14 to a mouth 18 at the end of the casing which is the lower end in the drawing.

An electrically insulating ceramic pipe 20 is inserted into the supporting tube 14. A working gas, e.g. air, is supplied through the supporting tube 14 and the ceramic pipe 20 into the nozzle channel 16. By means of a swirl system 22 inserted into the ceramic pipe 20, the working gas is swirled so that it flows through the nozzle channel 16 and to the mouth 18 in vortex fashion, as is symbolized by a helical arrow in the drawing. Inside of the nozzle channel 16, a vortex core is formed, which extends along the axis A of the casing.

Mounted to the swirl system 22 is a stud-shaped electrode 24 which projects coaxially into the nozzle channel 16 and to which an alternating current with high frequency is applied by means of a high voltage generator 26. The casing 10, which is formed of metal, is grounded through the bearing 12 and the supporting tube 14 and serves as a counter electrode, so that an electric discharge can be created between the electrode 24 and the casing 10. When the high voltage generator 26 is switched on, there is at first created a corona discharge at the swirl system 22 and the electrode 24, because of the high frequency of the alternating current and because of the dielectric properties of the ceramic pipe 20. An arc discharge from the electrode 24 to the casing 10 is then ignited by this corona discharge. The electric arc of this discharge is entrained by the swirling flow of working gas and is channeled in the core of the vortex flow, so that the arc extends along an almost straight line from the tip of the electrode 24 along the axis A and is branched radially towards the wall of the casing only when it reaches the mouth of the casing 10. Thus, a plasma jet 28 is generated which exits through the mouth 18.

The mouth 18 of the nozzle channel is formed by a metal mouth piece 30 which is screwed into a threaded bore 32 of the casing 10 and in which a passage 34 is formed which is tapered towards the mouth 18 and is inclined relative to the axis A. Thus, the plasma jet 28 exiting from the mouth 18 and the axis A of the casing form an angle which amounts to approximately 45° in the shown embodiment. By exchanging the mouth piece 30, this angle can be varied in accordance with the demand.

The expanded upper part of the casing 10 carries a friction disc or a toothed gear 36 which is drivingly connected to a motor (not shown), for example through a toothed belt or a pinion. In operation, the casing 10 driven by the motor is caused to rotate with a high speed of revolution around the axis A, so that the plasma jet 28 describes the generatrix of a cone which sweeps over the surface of a workpiece to be treated (not shown). When, then, the plasma nozzle is moved along the surface of the workpiece or, conversely, the workpiece is moved along the plasma nozzle, a relatively uniform pretreatment of the surface of the workpiece is achieved on a stripe the width of which corresponds to the diameter of the cone described by the plasma jet 28 at the surface of the workpiece. The width of the stripe being pretreated can be controlled by varying the distance of the mouth piece 30 from the workpiece. An intensive treatment of the surface of the workpiece with the plasma is achieved by the plasma jet 28 which impinges on the surface of the workpiece at an angle and, itself, is swirled. The swirling direction of the plasma jet can be in the same sense or in counter sense to the direction of rotation of the casing 10.

Figure 2:
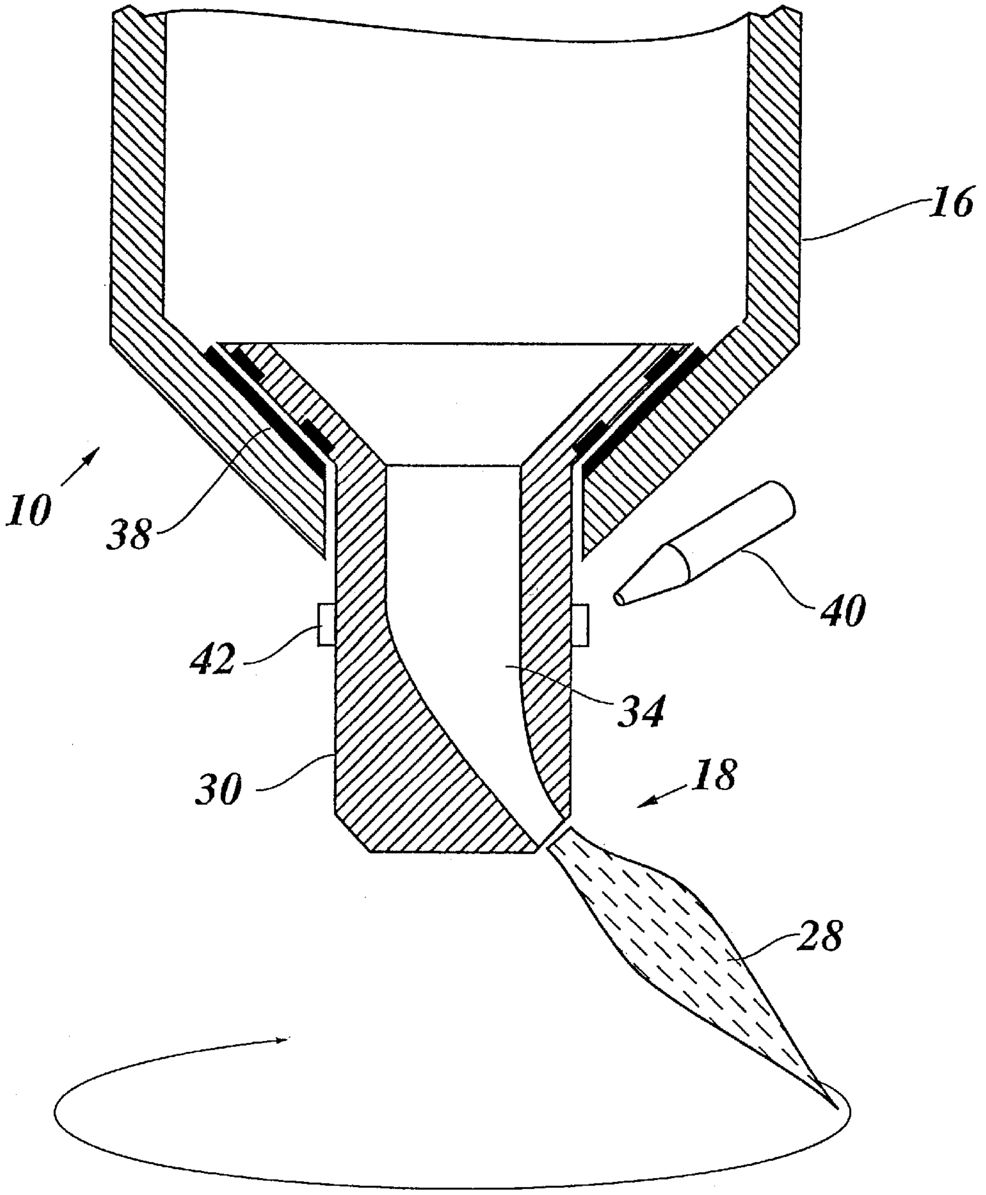
FIG. 2 is a section of the region of the mouth of the plasma nozzle according to a modified embodiment.

FIG. 2 shows an embodiment in which only the mouth piece 30 is rotatable relative to the stationary casing 10. Here, the casing 10 is conically tapered at the downstream end and forms an axial/radial bearing for a conically enlarged upstream part of the mouth piece 30. The bearing is formed by a magnet bearing 38 in the shown embodiment. The mouth piece 30 is on the one hand pressed against the bearing surface of the casing 10 under the action of the dynamic pressure of the existing air and is on the other hand held by the magnet bearing 38 so as not to contact the casing, so that a small gap with a width of only about 0.1 to 0.2 mm is formed between the mouth piece and the casing on the entire external circumference. The mouth piece 30 is grounded through arc discharge across this gap.

As a rotary drive system for the mouth piece 30 the shown embodiment employs an aerodynamic drive system formed for example by an air nozzle 40 through which air is tangentially blown against blades 42 provided at the outer circumference of the mouth piece. As an alternative, the aerodynamic drive system may also be provided by blades or fins provided internally of the mouth piece and hit by the swirling flow of air through the passage 34. In yet another alternative, the rotary movement of the mouth piece 30 can be created by a slightly tilted arrangement of the mouth 18 in circumferential direction, so that the mouth piece is rotated by the reaction forces of the air that is being jetted out.

This embodiment has the advantage that the construction of the rotary drive system is simplified and the moment of inertia of the rotating masses is reduced to minimum.

What is claimed is:

1. Plasma nozzle for pretreating surfaces, comprising:

a casing defining a nozzle channel which has an axis and a mouth and through which a working gas is passed, and the mouth of the nozzle channel being angled relative to the axis of the nozzle channel, an electrode disposed coaxially in the nozzle channel, a counter electrode surrounding the nozzle channel, and a swirl system causing the working gas to flow through the nozzle channel and to the mouth in a vortex fashion, such that an electric arc of a discharge from the electrode to the counter electrode is entrained by the swirling flow of working gas and is channeled in a core of the vortex flow.

2. Plasma nozzle according to claim 1, wherein the casing is rotatable about the axis of the nozzle channel.

3. Plasma nozzle according to claim 2, wherein the electrode is held stationary and the casing is rotatable relative to the electrode.

4. Plasma nozzle according to claim 3, wherein the casing is rotatably supported on a supporting tube through which the working gas is supplied to the nozzle channel.

5. Plasma nozzle according to claim 1, wherein the counter electrode is formed by the casing.

6. Plasma nozzle according to claim 5, wherein the counter electrode is grounded.

7. Plasma nozzle according to claim 3, comprising an electrically conductive bearing which rotatably supports the casing on a supporting tube through which the working gas is supplied to the nozzle channel, wherein the casing forms the counter electrode and is grounded through the electrically conductive bearing and the supporting tube.

8. Plasma nozzle according to claim 7, wherein a drive disk for rotatingly driving the casing is provided on the outer periphery of the casing.

9. Plasma nozzle according to claim 1, wherein the mouth of the nozzle channel is formed in a mouth piece which is inserted in the casing and in which a passage is defined which is inclined relative to the axis of the casing.

10. Plasma nozzle according to claim 9, wherein the passage of the mouth piece is tapered towards its downstream end.

11. Plasma nozzle according to claim 9, wherein the mouth piece is rotatably supported in the casing.

12. Plasma nozzle according to claim 11, wherein the mouth piece is supported in the casing by means of a contactless bearing.

13. Plasma nozzle according to claim 12, wherein the counter electrode is formed by the mouth piece and the contactless bearing defines a gap between the casing and the mouth piece, and said gap is so dimensioned that an arc discharge occurs across this gap, thereby to ground the mouth piece.

14. Plasma nozzle according to claim 13, wherein the contactless bearing is an axial/radial bearing and the mouth piece is dynamically biased against this bearing by the working gas flowing through the mouth piece.

15. Plasma nozzle according to claim 11, wherein the mouth piece is aerodynamically driven for rotation.

16. Plasma nozzle according to claim 9, wherein the mouth piece is detachable from the casing.

17. Plasma nozzle according to claim 7, wherein a toothed gear for rotatably driving the casing is provided on the outer periphery of the casing.

* * * * *